Nov. 30, 1954
J. SUNNEN
2,695,787
CHUCK ADAPTER
Filed Aug. 15, 1952
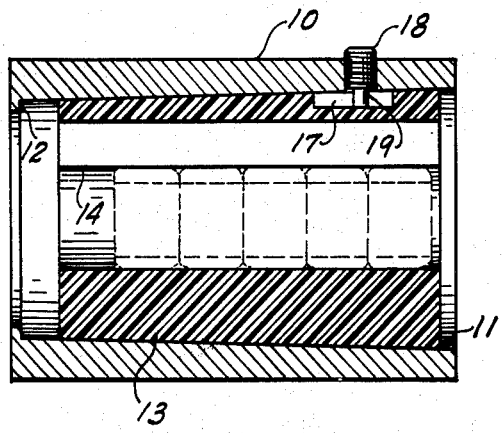
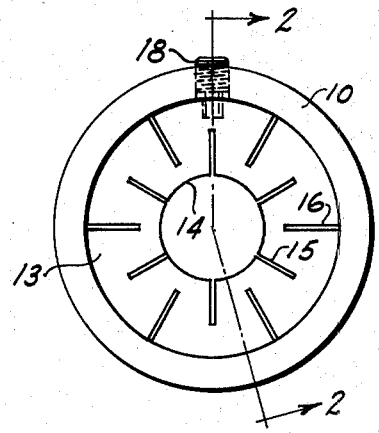
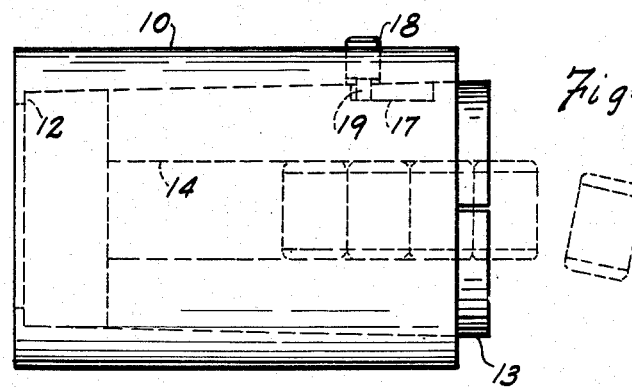
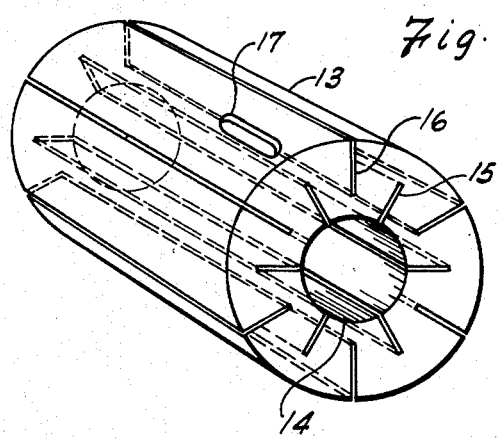
INVENTOR
JOSEPH SUNNEN
BY
*George R. Ericson*
ATTORNEY United States Patent Office 2,695,787
Patented Nov. 30, 1954

2,695,787

CHUCK ADAPTER

Joseph Sunnen, Clayton, Mo.

Application August 15, 1952, Serial No. 304,521

6 Claims. (Cl. 279—46)

This invention relates to resilient chuck adapters for holding rotated work and particularly to an adapter having a long annular work gripping surface in which a number of short cylindrical work pieces may be suitably chucked simultaneously.

When finishing the interior of short hollow cylindrical work pieces such as bushings, as by lapping or grinding, a considerable saving of labor and time may be effected by simultaneously chucking a number of such short pieces end to end so that they may be lapped or ground by a continuous longitudinal movement of the finishing tool. Also, it will be seen that this expediency will be substantially enhanced if the operations of chucking and releasing the work can be accomplished simply and quickly. However, in order to perform identical and precise operations on such several work pieces, it is necessary that they be held rigidly in accurate alignment and with an adequate and uniform holding force. It will be understood that due to slight variations in manufacturing the short pieces may vary in size of the outside diameter, and therefore could not be held satisfactorily in a metallic chuck, and at the same time, a rubber chuck would not hold them accurately in position.

An object of this invention is to provide an improved resiliently contractible chuck adapter which may be readily chucked in a conventional chuck and which is operated to a contracted or released position by simply applying thereto an axial force.

A further object is to provide a chuck adapter having a long annular chucking surface over the length of which a uniform radially acting work holding force is applied.

A further object is to provide a resilient chuck adapter of simple and rugged construction which is opened or closed quickly and in which an adequate work holding force is applied by a moderate closing force.

A further object is to provide a chuck adapter having an elongated radially contractible sleeve member in which the combination of its construction, together with the elasticity and specific gravity of its material, jointly provide a light weight member which is readily contracted by moderate radially acting forces, but which at the same time is highly rigid otherwise.

A further object is to provide a chuck adapter having a rigid internally tapered outer sleeve member and a radially contractible externally tapered inner sleeve member, the wall of which is reduced in thickness uniformly throughout its length at circumferentially spaced points so as to provide a wall uniformly resilient whereby a uniform holding force throughout the length of the sleeve is applied to work placed therein when the inner sleeve is pressed into the outer sleeve.

A further object is to provide an inner radially contractible sleeve member as above, in which circumferentially spaced radial slots alternately extending inwardly from the exterior and outwardly from the interior of the sleeve wall and extending longitudinally the full length of the sleeve provide both uniform resilience throughout the length of the sleeve and a uniform distribution of space to permit transverse displacement as the sleeve is contracted.

A further object is to provide a resiliently contractible inner sleeve member as above, which is constructed of a synthetic plastic material.

These and other objects and advantages which will become apparent upon reading the following description in connection with the accompanying drawing are the purposes of the present invention.

In the drawing;

Fig. 1 is an outer end or loading end view of a chuck adapter constructed in accordance with the present invention;

Fig. 2 is a longitudinal sectional view of the device shown in a closed position, the view being taken on line 2—2 of Fig. 1;

Fig. 3 is a side view of the device when in a released position; and

Fig. 4 is an isometric view of the inner contractible sleeve member.

Referring to the drawing in more detail, a rigid outer sleeve member is indicated at 10, which sleeve may be either of true cylindrical form, as shown, or it may be shaped in any suitable manner so as to be adaptable to a driving means, such as the tapered bore of the spindle of a lathe. Sleeve 10 has a tapered bore 11 concentric with its outer diameter. At its left end, the bore 11 is abruptly reduced in diameter to provide a shoulder 12 for a purpose to be explained hereinafter. Within the outer sleeve 10 is a resiliently contractible sleeve member 13 having an outside diameter which is tapered equally to that of the tapered bore 11 and is provided with a true cylindrical bore 14 concentric with its outer diameter wherein a plurality of short cylindrical work pieces are received, as illustrated. The inner sleeve 13 is adapted to be contracted as it is pressed inwardly into the outer sleeve 10, thereby causing a contraction of bore 14 to chuck the work pieces therein. The outer sleeve 10, as will be seen, is made somewhat longer than inner sleeve 13.

Inner sleeve 13 is provided with narrow radial slots 15 extending outward from bore 14 and narrow radial slots 16 which extend inward from its outer surface. The slots 15 and 16, which also extend longitudinally the full length of the sleeve 13, are alternately arranged and equally spaced circumferentially. In order to retain the inner sleeve 13 within the outer sleeve 10 while at the same time permitting limited reciprocation, a longitudinal keyway 17 is provided in the outer surface of the inner sleeve 13 and a set screw 18 is provided which is threaded in the wall of outer sleeve 10 and has a reduced end 19 which enters the keyway 17.

The outer sleeve 10 may be constructed of any material having suitable rigidity for the present purpose, preferably a metal hard enough so as to resist scoring by repeated chucking in conventional chucks. The inner contractible sleeve 13 is, however, constructed of a material having a modulus of elasticity which is considerably lower than that of any of the commercially available metals and yet is sufficiently high so as to limit cubic displacement or flow of the material under stresses incident to its present use to the extent that the essential rigidity is preserved. A light weight material possessing sufficient toughness and having a Young's Modulus E of between 150,000 and 500,000 p. s. i. has been determined as being suitable for this purpose. Presently, I prefer to use the synthetic plastic nylon which is commercially available in extruded bar stock having a modulus of elasticity in tension of approximately 260,000 p. s. i.

In order to provide for the frictional retention of the inner sleeve when in its contracted closed position, the taper of inner sleeve 13 and cooperating bore 11 has been made approximately five-eighths of an inch per foot. It has been determined that a rate of taper of less than 1 to 15 is essential to provide for the frictional retention of the inner sleeve when in a closed position. The depths of slots 15 and 16 are diminished from the large end to the small end of tapered sleeve 13 so as to provide a substantially equal net sectional area through the length of the sleeve, thereby to effect equal resiliency and therefore equal stressing. The arrangement of slots 15 and 16, as by alternately entering from the inner and outer surface of the sleeve, is such that space for displacement of material upon contraction of the sleeve is distributed equally both longitudinally and transversely of the sleeve.

In operation; when it is desired to load the chuck adapter, it is removed from the chuck of the turning machine and the inner sleeve 13 is then pressed outwardly to the released position shown in Fig. 3. When in this position, further outward movement of the sleeve is prevented by set screw 18. This pressing operation may be accomplished in any suitable manner as by a light hand-operated arbor press. When in the released position, a number of short cylindrical work pieces may be loaded in the bore 14 which, it will be seen, provides a long annular internal chucking surface. After the work is loaded, the inner sleeve 13 is again pressed into the sleeve 10 with a moderate pressure and the loaded adapter is then ready to be chucked in the turning machine.

The construction of sleeve 13 and the elasticity of its material substantially reduce its resistance to contraction, and further, its relatively low modulus of elasticity, as in the aforementioned range, permits a microscope displacement due to compression stress between the work and the surface of bore 14 which results in a fine equalization of forces and the "hugging" of individual work pieces without sacrificing the rigidity essential to precision workmanship. The length of outer sleeve 10 is made sufficiently longer than inner sleeve 13 so as to effect sufficient expansion and contraction to permit easy ejection of the work when released and an adequate holding force when contracted. The stop shoulder 12 at the left end of bore 11 limits the contraction of the inner sleeve to a point safely within its elastic limit.

The foregoing description is intended to be illustrative and not limiting, the scope of the invention being set forth in the appended claims.

I claim:

1. In a device of the kind described, a tapered contractible adapter sleeve for uniformly holding a plurality of short cylindrical work pieces having a uniform internal diameter for receiving the work pieces and having circumferentially spaced radial slots extending partially through the wall thereof and extending longitudinally the entire length thereof, and said sleeve being constructed of a synthetic plastic having a modulus of elasticity in tension of at least 150,000 p. s. i.

2. In a device of the kind described, a tapered contractible adapter sleeve for uniformly holding a plurality of short cylindrical work pieces, having a relatively thick wall and a uniform internal diameter for receiving the work pieces and being slit radially partially through the wall thereof at circumferentially spaced points, which slits alternately extend inwardly from its outer surface and outwardly from its inner surface and extend longitudinally the entire length thereof, and which sleeve is constructed of a synthetic plastic material.

3. A tapered contractible chuck adapter sleeve having a relatively thick wall and a uniform internal diameter for receiving round work, said sleeve being constructed of nylon and having circumferentially spaced radial slots in the wall thereof which extend longitudinally the entire length thereof.

4. A tapered contractible adapter sleeve of relatively thick wall having a uniform interior diameter and being slit radially through the wall thereof alternately from its inner and outer surface and at circumferentially spaced points, which slits extend longitudinally the entire length of said sleeve, and said sleeve being constructed of a material having a modulus of elasticity in tension of not less than 150,000 p. s. i., nor more than 500,000 p. s. i.

5. A chuck adapter having a rigid cylindrical outer casing adapted to be received in a chuck, said casing being constructed of metal and having a longitudinal bore which is uniformly tapered at a rate not greater than 1 in 15, an inner contractible sleeve member constructed of a synthetic plastic and having its external surface tapered substantially equal to that of said bore, said inner sleeve member having a relatively thick wall in which radial slots which alternately extend inwardly from its outer surface and outwardly from its inner surface are uniformly spaced circumferentially and extend longitudinally the entire length thereof, and means limiting axial movement of said contractible sleeve within said outer casing, said latter means being adjustable to permit removal of the sleeve.

6. A chuck adapter having a rigid outer casing provided with a tapered longitudinal bore, a shorter inner radially contractible sleeve member having an external taper equal to that of said bore and being of such diameter as to freely enter said bore to the extent that its large end is flush with the large end of said bore, said bore being of such length that said sleeve may be fully contracted by being pressed thereinto and being terminated in a shoulder for stopping the inward movement of said contractible sleeve, a longitudinal keyway in the outer surface of said contractible sleeve and a threadedly removable pin in said outer casing for engaging said keyway thereby to limit the outward movement of said inner contractible sleeve.

References Cited in the file of this patent

UNITED STATES PATENTS

| Number | Name | Date |
|---|---|---|
| 1,869,322 | Bush | July 26, 1932 |
| 2,082,345 | Lasser | June 1, 1937 |
| 2,346,706 | Stoner | Apr. 18, 1944 |

FOREIGN PATENTS

| Number | Country | Date |
|---|---|---|
| 482,024 | Germany | 1929 |